United States Patent
Chauvin et al.

(10) Patent No.: US 10,654,213 B2
(45) Date of Patent: May 19, 2020

(54) APPARATUS AND METHOD FOR FABRICATING CONTAINERS

(71) Applicant: DISCMA AG, Hunenberg (CH)

(72) Inventors: Guillaume Chauvin, Duchess Manor (SG); Klaus Hartwig, Nancy (FR); Damien Kannengiesser, Golbey (FR)

(73) Assignee: DISCMA AG, Zürich (CH)

( * ) Notice: Subject to any disclaimer, the term of this patent is extended or adjusted under 35 U.S.C. 154(b) by 684 days.

(21) Appl. No.: 14/897,172

(22) PCT Filed: Jun. 2, 2014

(86) PCT No.: PCT/EP2014/061321
§ 371 (c)(1),
(2) Date: Dec. 9, 2015

(87) PCT Pub. No.: WO2014/198571
PCT Pub. Date: Dec. 18, 2014

(65) Prior Publication Data
US 2016/0129623 A1    May 12, 2016

(30) Foreign Application Priority Data
Jun. 10, 2013    (EP) .................................... 13171262

(51) Int. Cl.
*B29C 49/64* (2006.01)
*B29C 49/06* (2006.01)
(Continued)

(52) U.S. Cl.
CPC ...... *B29C 49/6409* (2013.01); *B29C 35/0805* (2013.01); *B29C 49/0042* (2013.01);
(Continued)

(58) Field of Classification Search
CPC .................... B29C 2035/0822; B29C 49/0042
See application file for complete search history.

(56) References Cited

U.S. PATENT DOCUMENTS 2,564,656 A    8/1951  Chedister
3,950,459 A *  4/1976  Seefluth .............. B29C 49/6436
                                                    264/521
(Continued)

FOREIGN PATENT DOCUMENTS

DE          903628 C        2/1954
GB         2095611 A  * 10/1982 ......... B29C 49/6418
JP        63078728 A  *  4/1988 ............. B29C 49/12

*Primary Examiner* — Atul P. Khare
(74) *Attorney, Agent, or Firm* — Eric J. Sosenko; Jonathan P. O'Brien; Honigman LLP

(57) ABSTRACT

An apparatus for fabricating a container. The apparatus includes an injection head establishing fluid communication between an injection liquid source and a preform cavity of a substantially tubular preform through a nozzle of the injection head. The longitudinal axis of said injection head being substantially vertically oriented and passing through the nozzle. The apparatus further includes a plurality of infrared-emitting elements projecting infrared radiation into an expansion zone which is disposed adjacent to the nozzle and about the longitudinal axis. The expansion zone is configured to accommodate the preform when it is positioned in fluid communication with the nozzle.

11 Claims, 3 Drawing Sheets

(51) Int. Cl.
   *B29C 49/00*   (2006.01)
   *B29C 49/68*   (2006.01)
   *B29C 35/08*   (2006.01)
   *B29C 49/08*   (2006.01)
   *B29C 49/12*   (2006.01)
   *B29K 67/00*   (2006.01)
   *B29K 105/00*   (2006.01)
   *B29L 31/00*   (2006.01)

(52) U.S. Cl.
   CPC .............. *B29C 49/06* (2013.01); *B29C 49/64* (2013.01); *B29C 49/68* (2013.01); *B29C 49/12* (2013.01); *B29C 2035/0822* (2013.01); *B29K 2067/003* (2013.01); *B29K 2105/258* (2013.01); *B29L 2031/712* (2013.01)

(56) References Cited

U.S. PATENT DOCUMENTS

| | | | | |
|---|---|---|---|---|
| 4,204,111 A * | 5/1980 | Yonko | ............... | B29C 49/68 219/388 |
| 4,657,502 A * | 4/1987 | Rydmann | ............... | B29C 49/08 264/531 |
| 5,256,341 A * | 10/1993 | Denis | ............... | B29B 11/00 264/458 |
| 5,611,987 A * | 3/1997 | Kato | ............... | B29C 49/12 264/458 |
| 5,681,521 A * | 10/1997 | Emmer | ............... | B29C 49/6436 264/521 |
| 6,080,353 A * | 6/2000 | Tsuchiya | ............... | B29C 49/6445 264/458 |
| 6,113,840 A * | 9/2000 | Emmer | ............... | B29C 49/6436 264/521 |
| 6,361,301 B1 * | 3/2002 | Scaglotti | ............... | B29C 49/6445 264/454 |
| 6,372,318 B1 * | 4/2002 | Collette | ............... | B29C 49/12 215/375 |
| 7,121,821 B2 * | 10/2006 | Pickel | ............... | B29C 49/6445 425/174.4 |
| 8,303,290 B2 * | 11/2012 | Feuilloley | ............... | B29B 13/024 425/174.4 |
| 9,421,709 B2 * | 8/2016 | Kumar | ............... | B29C 49/46 |
| 2002/0062161 A1 | 5/2002 | Dusterhoft | | |
| 2007/0284788 A1 | 12/2007 | Kurosaki et al. | | |
| 2013/0221579 A1 | 8/2013 | Bellec et al. | | |

* cited by examiner

APPARATUS AND METHOD FOR FABRICATING CONTAINERS

CROSS-REFERENCE TO RELATED APPLICATIONS

This application is the U.S. national phase of PCT Application No. PCT/EP2014/061321 filed on Jun. 2, 2014, which claims priority to EP13171262.2 filed on Jun. 10, 2013, the disclosures of which are incorporated in their entirety by reference herein.

TECHNICAL FIELD

The invention relates to an apparatus for fabricating a container, notably by the method of blow molding. It also relates to a method for employing such an apparatus to fabricate a container.

BACKGROUND OF THE INVENTION

It is known to fabricate containers by blow molding, wherein a substantially tubular plastic parison commonly referred to as a "preform" is disposed in the cavity of a mold and expanded into the shape thereof by the injection of a pressurized fluid into said preform. This method lends itself well to the rapid fabrication of containers of consistently high quality.

A common variant of this process is stretch blow molding, in which a stretching rod is inserted into the preform and urged against an interior surface thereof, inducing the preform to deform along its longitudinal axis. This is particularly favored in that it enables one to exercise a greater deal of control over the longitudinal deformation of the preform, thereby enabling the production of a wider range of container shapes and sizes than by simple expansion alone.

A typical blow-molding apparatus comprises a mold, in which is provided a mold cavity in the form of the container to be produced. The preform is provided in a substantially tubular form globally resembling a test tube and which is disposed at least partially within the mold, conventionally being inserted into the mold cavity through a hole disposed in an upper surface of the mold.

Prior to being inserted into the mold, the preform is generally heated above the glass transition temperature of the thermoplastic resin from which the preform is fabricated. This will soften the preform and thus increase its propensity to deform, facilitating its formation into a container.

Preferably, a small portion of the preform protrudes from the mold, permitting the attachment of an injection head to a mouth of the preform in communication with an internal cavity of the preform. This mouth portion of the preform is usually furnished with threads, rims, or other such means for interfacing with a closure device such as a cap, and remains substantially unchanged during the container forming process while the rest of the preform is expanded into a container.

To effectuate the expansion of the preform, a fluid under pressure is injected into the cavity of the preform to induce the preform to expand. While traditionally this fluid was a pressurized gas such as compressed air, it has become known to inject a non-compressible injection liquid instead. This offers a greater degree of control over the molding process, and where the injection liquid is the product to be packaged within the container combines the forming and filling steps to realize a considerable gain in process efficiency.

While many such blow molding processes employ molds as described above, it has recently become known to form containers by free-blowing. In the free-blowing process, the preform is fixed in the molding apparatus at an open end thereof, but is otherwise unrestrained by a mold as it expands under the pressure of the injection liquid. In a common variant of this process, a partial mold is provided to define a portion of the container, for instance a shallow cup-shaped plate to define the bottom of the container, while permitting the preform to expand freely over the rest of its surface.

The free-blowing molding process is advantageous in that the dimensions of the container are a function of the volume of liquid injected therein, and in that it minimizes or eliminates the cost of providing molds.

The free-blow molding process is not without its disadvantages. During the fabrication of the container the preform cools, such cooling accelerating with the expansion of the container. In particular, the injection liquid will serve as a heat sink, drawing the heat out from the preform. This limits the maximum volume of container that may be fabricated before the preform cools to below a temperature at which expansion may occur without producing defects in the finished container.

To combat this, it is necessary to compensate for the heat lost during the forming process, presently accomplished by furnishing a preform which is thicker and heavier than would be otherwise necessary so as to compensate for the loss of heat to the injection liquid. Containers so formed are disadvantaged with a corresponding increase in thickness, weight, and expense.

It is therefore an objective of the invention to provide a container fabricating-apparatus which provides means for heating a preform undergoing expansion in a free-blowing molding process. It is a further objective of the invention to provide a method by which such an apparatus is employed.

SUMMARY OF THE INVENTION

In a first aspect of the invention there is provided an apparatus for the fabrication of a container, comprising an injection head configured to establish fluid communication between an injection liquid source and a preform cavity of a substantially tubular preform through a nozzle of said injection head, a longitudinal axis of said injection head being substantially vertically oriented and passing through said nozzle.

According to the invention, said apparatus further comprises a plurality of infrared-emitting elements disposed so as to project infrared radiation into an expansion zone, said expansion zone being disposed adjacent to said nozzle and about said longitudinal axis of said injection head, and configured to accommodate said preform when said preform cavity is disposed in fluid communication with said nozzle of said injection head.

This is advantageous in that the infrared radiation which is directed into the expansion zone will heat a preform which is therein disposed during the usage of the apparatus. Specifically, the disposition of the expansion zone adjacent to the nozzle of the injection head means that when the injection head is positioned in fluid communication with a preform to form it into a container, the preform is located within the expansion zone and will be heated by the infrared radiation which the infrared-emitting elements project into that zone. The loss of heat in the preform to the injection liquid may be thereby compensated, avoiding the need to furnish a heavy preform to provide the required heat. A container-fabricating apparatus so conceived will produce containers which are less expensive and of a more consistently high quality than the apparatuses known in the art.

In a possible embodiment, the infrared-emitting elements have a substantially vertically-oriented longitudinal axis, said infrared-emitting elements being disposed at substantially equal intervals about the longitudinal axis of the injection head in an arrangement substantially conforming to a curved contour.

Preferably, the curved contour is substantially circular.

This is advantageous in that a vertically-oriented array of infrared elements disposed about the expansion zone along a curved contour will irradiate yield an even irradiation from every direction at the longitudinal axis of the injection head. When the curved contour is substantially circular, the irradiation is also uniform about the longitudinal axis of the preform. This promotes the symmetric deformation of a preform disposed in that expansion zone into a container of uniformly-circular cross section. The containers produced by an apparatus so configured are thereby rendered more uniform.

In another possible embodiment, the infrared-emitting elements have a substantially horizontally-oriented longitudinal axis and are grouped into a plurality of arrays, each element being substantially parallel to each other element in its respective array, said arrays being disposed at substantially equiangular intervals about the longitudinal axis of said injection head.

Optionally, each infrared-emitting element is disposed in an arrangement substantially conforming to a curved contour.

In particular, the curved contour is a segment of a substantially circular arc.

Alternately, the infrared-emitting elements of each array are disposed so as to be substantially coplanar.

Disposing the infrared-emitting elements in one of these arrangements is advantageous in that the disposition of the infrared-emitting elements will govern the intensity of the infrared irradiation of the expansion zone along the longitudinal axis. The irradiation of a preform disposed in the expansion zone may thereby be tailored to realize a greater amount of heating in certain areas along the length of the preform than in others, thereby realizing a greater deal of control over the expansion of the preform during the fabrication of a container therefrom. Alternately, the irradiation may be tailored to ensure an even and consistent irradiation, and thereby an even and consistent heating, of the preform. The apparatus is thereby rendered more capable and adaptable, and the range of container forms which it may produce is enlarged.

Preferably, the infrared-emitting elements are disposed such that a line perpendicular to the longitudinal axis of each element intersects both said element at the midpoint thereof and the longitudinal axis of said injection head.

This is advantageous in that the infrared-emitting elements of an apparatus so configured will be symmetrically-positioned with regard to the longitudinal axis of the injection head, in that both ends of the infrared-emitting elements will be equidistant to said longitudinal axis. A preform disposed in the expansion zone of an apparatus so configured will receive a laterally-symmetric infrared irradiation, thereby improving the consistency and uniformity of the operation of the apparatus.

In a practical embodiment, the infrared-emitting elements are infrared light-emitting diodes.

This is advantageous in that infrared light-emitting diodes are compact and efficient; their use improves both the flexibility which with the apparatus may be configured and the efficiency with which it operates.

Alternately, the infrared-emitting elements are tungsten-filament incandescent lamps.

This is advantageous in that tungsten-filament incandescent lamps are inexpensive and emit infrared radiation of a very high intensity relative to that emitted by other types of infrared-emitting elements. This will increase the capability of the container-fabricating machine utilizing them while minimizing its cost.

Preferably, there is provided at least one shield disposed between the preform and the infrared-emitting elements, said shield having a coefficient of transmission of at least 90% for near and medium infrared waves.

This is advantageous in that such a shield will protect the infrared-emitting elements from damage during the operation of the container-fabricating apparatus, e.g. from splashes of injection liquid or fragments of a burst preform. This will further improve the reliability and cost-effectiveness of the apparatus.

In a second aspect of the invention, there is provided a container-fabrication ensemble comprising a substantially tubular preform having a preform cavity, and a container-fabricating apparatus as described above.

This is advantageous in that such an ensemble will produce a formed container from the preform, thereby embodying the advantages of the invention as described above.

In a third aspect of the invention, there is provided a method for fabricating a container, comprising the steps of providing a substantially tubular preform comprising a preform cavity in communication with a mouth disposed at an open end of said preform; preheating said preform in an oven so as to elevate said preform above its glass-transition temperature; positioning said preform in fluid communication with a nozzle of an injection head, said preform being thereby disposed within an expansion zone, said expansion zone being disposed adjacent to said nozzle and about a longitudinal axis of said injection head, and configured to accommodate said preform; injecting a volume of an injection liquid from said injection head into said preform cavity of said preform, thereby inducing said preform to expand into a container; and concurrently to said injecting step, heating said preform by energizing a plurality of infrared-emitting elements disposed about said preform and projecting infrared radiation into said expansion zone.

This is advantageous in that over the duration of the expansion of the preform into a container, the preform is maintained at a temperature above the glass-transition temperature of the material from which it is fabricated. As its temperature is so maintained despite the injection of the injection liquid, the preform may be made thinner and lighter than would be otherwise possible, reducing the cost of its provision and producing lightweight, high-quality containers.

In a possible embodiment, during the heating step the infrared radiation projected by the infrared-emitting elements is more intensely incident upon the preform over certain regions thereof than over other regions, thereby creating a temperature gradient over said preform.

Alternately, during the preheating step the preform is heated so as to create a temperature gradient over the surface of said preform, said preform being heated evenly by the infrared-emitting elements during the heating step.

This is advantageous in that the desired temperature gradient will be maintained over the preform for the entirety of the molding process, ensuring that the resulting container is correctly formed.

DETAILED DESCRIPTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention and do not limit the scope of the invention when taken into consideration with the claims and the following detailed description. In the present description, the following words are given a definition that should be taken into account when reading and interpreting the description, examples and claims.

"Infrared" is a band of the electromagnetic radiation spectrum having a wavelength generally between 700 nanometers and 1 millimeter. "Near Infrared" and "Medium Infrared" are the portions of this band having wavelengths between 750 and about 3,000 nanometers; and between 3,000 and 8,000 nanometers, respectively;

"Injection Liquid" is a non-compressible liquid substance injected under pressure into said preform during a process for the forming of the latter so as to induce said preform to plastically deform; and A "Preform" is a substantially tubular object fabricated from a thermoplastic resin and configured to interface with an apparatus for molding it into a container.

As used in this specification, the words "comprises", "comprising", and similar words, are not to be interpreted in an exclusive or exhaustive sense. In other words, they are intended to mean "including, but not limited to.

Any reference to prior art documents in this specification is not to be considered an admission that such prior art is widely known or forms part of the common general knowledge in the field.

The invention is further described with reference to the following examples. It will be appreciated that the invention as claimed is not intended to be limited in any way by these examples.

The main principle of the invention is first described.

Figure 1A:
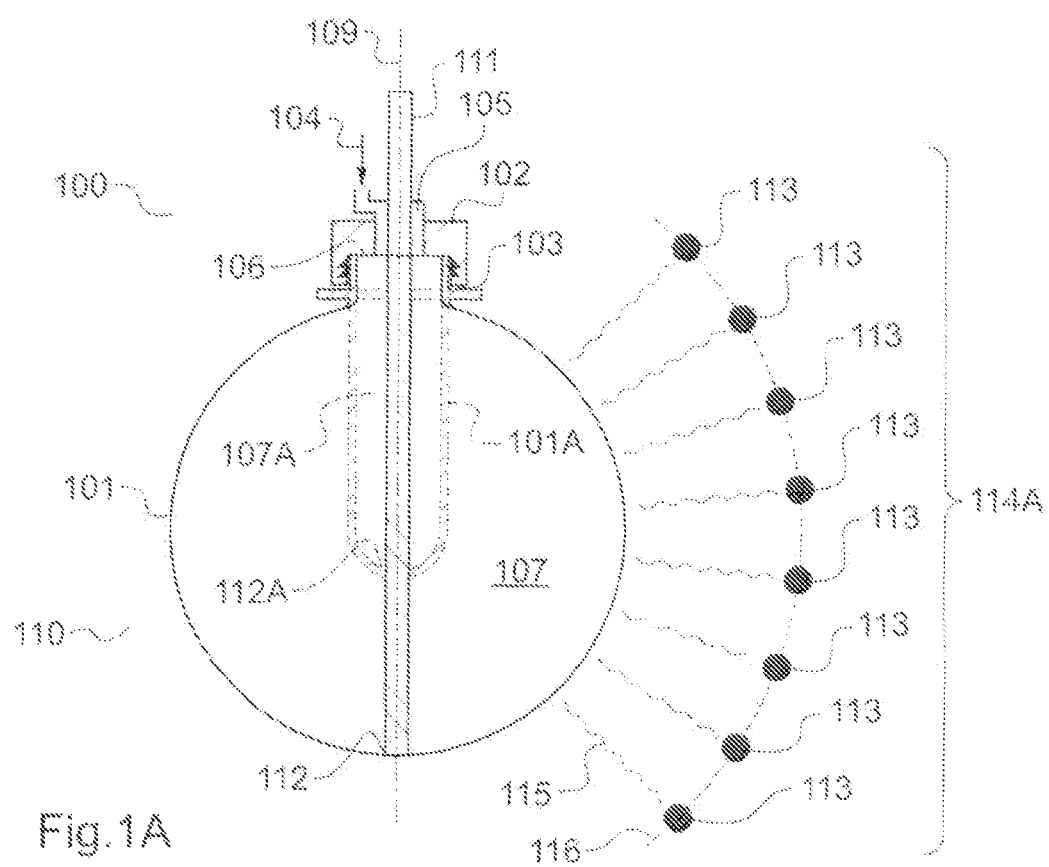
FIGS. 1A & 1B are a side and top view, respectively, of a container-fabricating apparatus according to a first embodiment incorporating the principles of the invention.

FIG. 1A is a side view of a container-fabricating apparatus 100 according to a first embodiment incorporating the principles of the present invention. In FIG. 1A the apparatus 100 is shown during the forming of the container 101 from the preform 101A.

The apparatus 100 is provided with an injection head 102. The injection head 102 comprises a nozzle 103, which is put into communication with a source of the injection liquid 104 by nozzle channel 105.

The nozzle 103 of the injection head 102 is configured to establish fluid communication with the mouth 106 of the preform 101A when disposed thereupon. During a container-forming process, the injection liquid 104 is injected into the cavity 107A of the preform 101A. As the injection liquid 104 is injected, the preform will expand, assuming the form of the container 101 as shown here, the container 101 enclosing a cavity 107 of a volume substantially equal to the volume of the injection liquid 104 injected during its forming.

As shown here, the injection head 102 is provided with a vertically-oriented longitudinal axis 109, which extends through the nozzle 103 and into an expansion zone 110 extending from said nozzle 103 generally along the longitudinal axis 109.

The injection head 102 is also provided with the stretching rod 111, which is advanced through the injection head 102 and out of the nozzle 103 into the mouth 106 of the preform 101A into contact with the interior surface thereof at a contact point 112A. During the container forming process, the stretching rod 111 is advanced to induce the preform 101A to deform in the longitudinal direction along the longitudinal axis 109.

The apparatus further comprises a plurality of infrared-emitting elements which are provided here in the form of the infrared lamps 113, grouped into the array 114A. The Infrared lamps 113, when energized, project the infrared radiation 115 into the expansion zone 110, thereby heating the preform 101A. This is preferably performed concurrently with the injection of the injection liquid 104, so as to compensate for the loss of heat in the preform 101A to the injection liquid 104.

The infrared radiation 115 is preferably within the near- to medium-infrared bands, such that it has a wavelength between 750 and 8,000 nanometers. The exact wavelength will depend on the particular material from which the preform is fabricated For instance, polyethylene terephthalate (PET) has an optimal infrared absorption at wavelengths around 1,700 nanometers. Tungsten-filament and Light-Emitting Diode (LED) infrared lamps are preferred for generating infrared radiation at such wavelengths, however the user may of course provide the container-fabricating apparatus with infrared-emitting elements of other types and in other configurations as appropriate to each individual application.

Furthermore, in this embodiment, the array 114A of infrared lamps 113 is disposed along the contour 116. Here, the contour 116 is in a form generally conforming to the contour of the container 101, here configured as a segment of a circular arc. However, it should be understood that the array 114A may be disposed along many different dispositions according to the particularities of each application, so as to favor the irradiation of certain regions of the preform 101A over others and thereby create a temperature gradient in the preform 101A along the longitudinal axis 109.

Furthermore, it should be noted that, while FIG. 1 depicts only the single array 114A for clarity, it is generally envisioned that the container-forming apparatus 100 will incorporate several such arrays, disposed symmetrically about the longitudinal axis 109 so as to evenly irradiate the preform 101A as it is being expanded into the container 101.

Figure 1B:
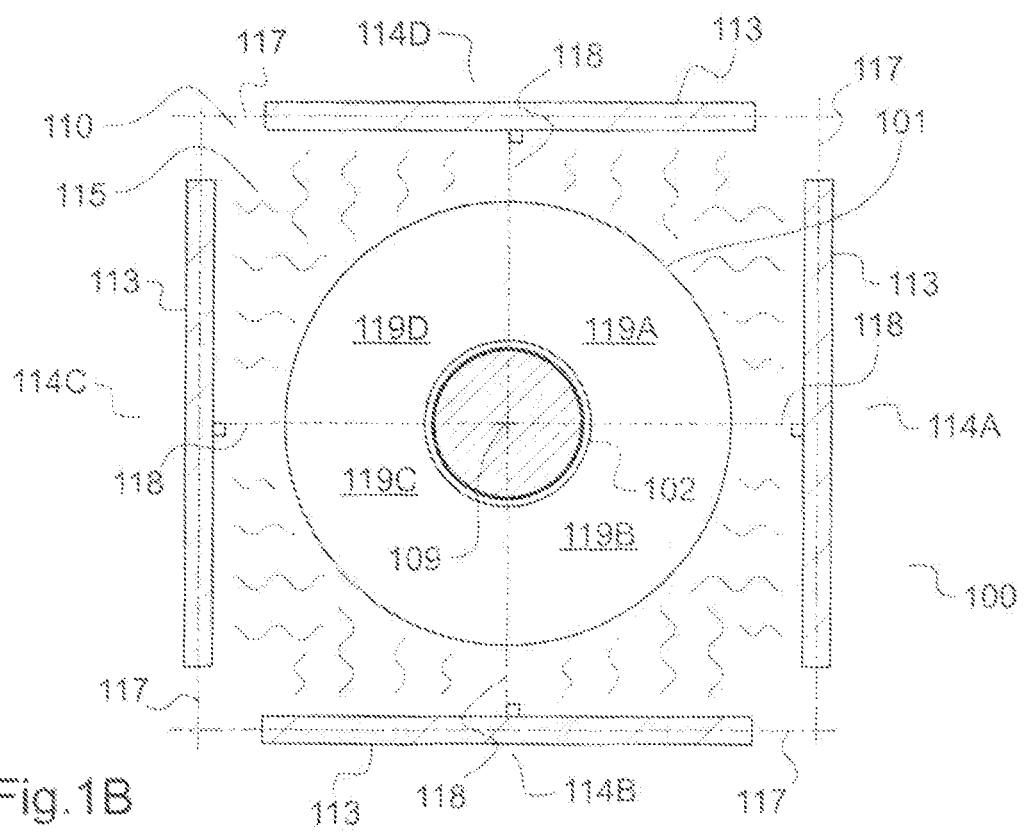

FIG. 1B is a depiction of the container-fabrication apparatus 100 from the top. The container 101 is disposed at the center of the expansion zone 110. Bounding the expansion zone 110 are four arrays 114A through 114D of infrared lamps 113, disposed in an equiangular arrangement about the longitudinal axis 109 (here perpendicular to the plane of the image and thus represented by a cross). For clarity, only one of the infrared lamps 113 of each of the arrays 114A-114D is depicted, however it should be understood that the arrays ideally comprise a plurality of infrared lamps 113, such as depicted in FIG. 1A, disposed in parallel to each other.

As can be seen in FIG. 1B, the infrared lamps 113 are elongate in form, each having a longitudinal axis 117. It should be noted that the longitudinal axes 117 of the infrared lamps 113 are disposed substantially horizontally, and the perpendicular bisector 118 of each infrared lamp 113 intersects the longitudinal axis 109 of the container-fabricating apparatus 100. This ensures that each of the arrays 114A-114D is square relative to the container 101, ensuring that each of the quadrants 119A through 119D of the expansion zone 110 are evenly bathed in the infrared radiation 115. The preform 101A will thus be evenly heated during the fabrication process, ensuring that the container 101 is substantially symmetric about the longitudinal axis 109.

Figure 2:
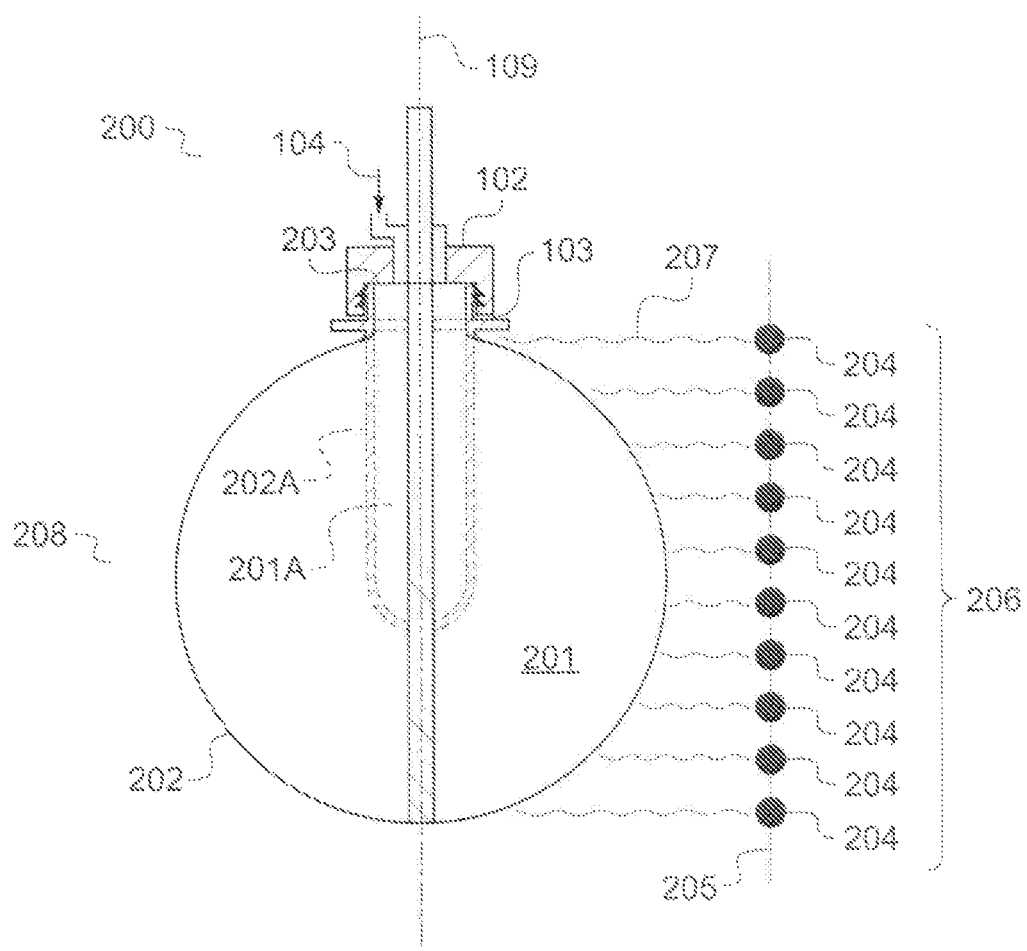
FIG. 2 is a side view of a container-fabricating apparatus according to a second embodiment incorporating the principles of the invention.

FIG. 2 depicts a side view of a container-fabricating apparatus 200 according to a second embodiment incorporating the principles of the present invention. The container-fabricating apparatus 200 of the second embodiment is similar to the one depicted in FIGS. 1A and 1B, in that it comprises an injection head 102 in fluid communication with the preform cavity 201A of a preform 202A, and is further provided with a longitudinal axis 109 disposed in a vertical orientation. The injection head 102 communicates with the preform cavity 201A through the mouth 203 of said preform 201A, which is disposed in fluid communication with the nozzle 103 of the injection head 102.

Upon the injection of the injection liquid 104 into the preform cavity 201A, the preform 202A will expand into the container 202. As in the previous embodiment, the container 202 encloses a cavity 201 of substantially the same volume as that of the injection liquid 104 injected during the fabrication of the container 202. Concurrently, the preform 202A is irradiated with infrared radiation so as to heat it, which will now be discussed.

In this second embodiment, as in the first embodiment, there is provided a plurality of infrared-emitting elements in the form of the infrared lamps 204. The infrared lamps 204 are here arranged so as to be mutually parallel and coplanar in the plane 205, thereby forming the array 206. As in the previous embodiment, it should be understood that while for reasons of clarity only the one array 206 is depicted here, the container-fabricating apparatus will preferably comprise a plurality of such arrays, disposed substantially symmetrically about the longitudinal axis 109.

The infrared lamps 204, when energized, emit the infrared radiation 207, which is projected into the expansion zone 208. The expansion zone 208, as in the previous embodiment, extends from the nozzle 103 of the injection head 102 and is centered along the longitudinal axis 109.

In this embodiment, the disposition of the infrared lamps 204 in the plane 205, itself parallel to the longitudinal axis 109, means that the irradiation of the preform 202A will be uniform along its entire length when the infrared lamps 204 are uniform in output.

Figure 3A:
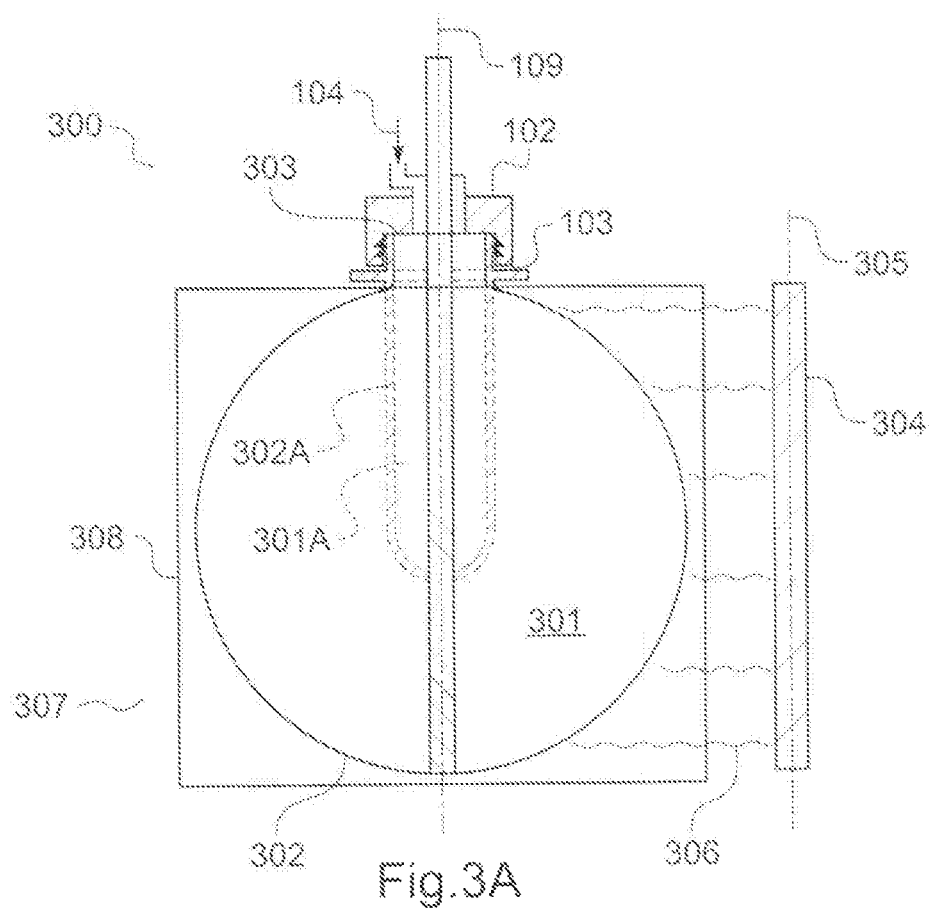
FIGS. 3A & 3B are a side and top view, respectively, of a container-fabricating apparatus according to a third embodiment incorporating the principles of the invention.

FIG. 3A is a side view of a container-fabricating apparatus 300 according to a third embodiment incorporating the principles of the present invention. As in the previous two embodiments, there is provided an injection head 102 in fluid communication with the preform cavity 301A of a preform 302A, the injection head having a longitudinal axis 109 disposed in a vertical orientation. The injection head 102 is in communication with the preform cavity 301A through the mouth 303 of said preform 302A, which is disposed in fluid communication with the nozzle 103 of the injection head 102. Upon the injection of the injection liquid 104 into the preform cavity 301A, the preform 302A is induced to expand and take the shape of the container 302, which encloses the cavity 301 having substantially the same volume as the injection liquid 104 used to form the container. Concurrently to this, the preform 302A is irradiated with infrared radiation so as to heat it, which will now be discussed.

In this third embodiment of the invention, as in the previous two, there are provided a plurality of infrared-emitting elements in the form of the infrared lamps 304. The infrared lamps 304, of which only one is depicted here for clarity, are elongate and each have a longitudinal axis 305 disposed substantially parallel to the longitudinal axis 109 of the injection head 102 so as to dispose the infrared lamps 304 in a vertical orientation.

When energized, the infrared lamps 304 will project infrared radiation 306 into the expansion zone 307 extending from the nozzle 103 of the injection head 102. During the operation of the container-fabricating apparatus 300, the infrared lamps 304 will thereby irradiate the preform 302A. As the infrared lamps 304 are disposed vertically, the preform 302A will be evenly irradiated along its length.

This third embodiment of the invention is further provided with a shield 308 disposed between the container 302 and the infrared lamps 304. The shield 308 serves to enclose the preform 302A/container 302 during and immediately after the fabrication process. The shield 308 serves to protect the area about the injection head, such as from splashing of the injection liquid 104 during normal operation or from flying debris should a defective preform 302A or container 302 burst under the pressure of injection.

The shield 308 may be made of tempered and/or laminated glass, polycarbonate resin, metal foil, or any other such material which is both resilient and at least 90% transparent to infrared radiation. Of course, it may in certain implementations be preferable to provide the shield as, for instance, individual fixtures for the infrared lamps 304 rather than a large enclosure about the container; the exact configuration and disposition of the shield may be determined by the user for each application.

Figure 3B:
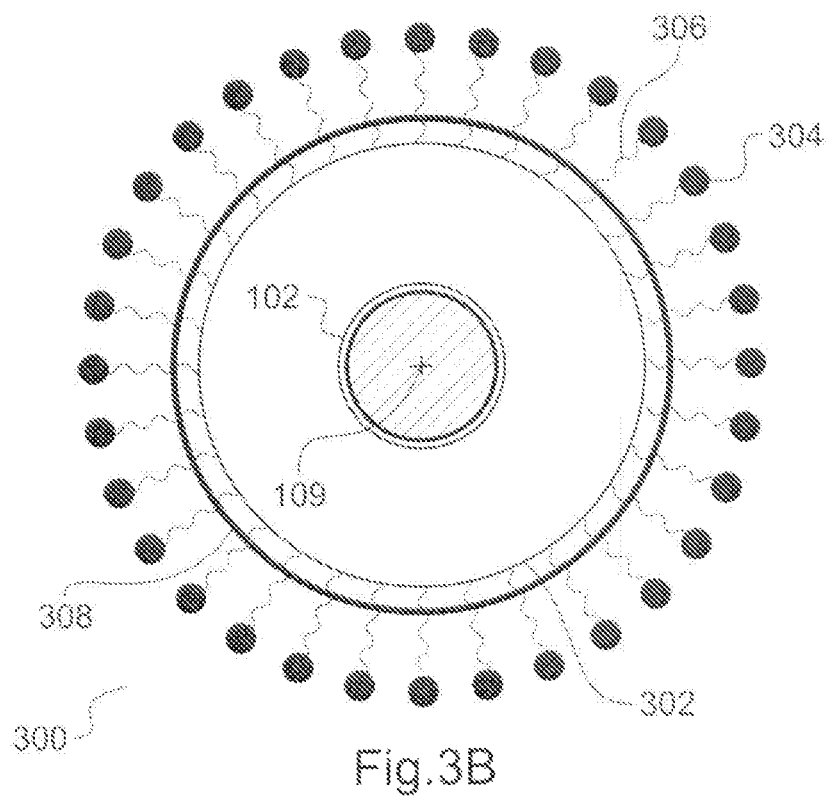

FIG. 3B is a top view of the container-fabricating apparatus 300 according to the third embodiment. The infrared lamps 304 are shown here disposed substantially equidistant from the surface of the container 302, and disposed at substantially-equal intervals about the longitudinal axis 109 of the injection head 102 (as in FIG. 1B, the longitudinal axis is here perpendicular to the plane of the paper and is as such depicted with a cross). The infrared lamps 304 are thereby disposed about the curved contour 309, which is here configured as a circle about the preform 302A. The infrared lamps 304 thereby surround the preform 302A and heat it evenly over its entire circumference as it is expanded into the container 302.

It should be noted that while the infrared lamps 304 are depicted in this embodiment as straight tubes, it is indeed possible to furnish them in other configurations. For instance, in an alternate embodiment it may be advantageous to furnish the infrared lamps in the form of a toroid, such that a plurality of toroidal lamps are disposed about the longitudinal axis of the preform. In another alternate embodiment, the infrared lamp may be furnished in the form of a helical tube, winding about the longitudinal axis of the preform. The precise configuration of the lamp(s) may be determined by the user according to the aspects of each particular implementation.

It should be understood that while the preceding embodiments disclose the basic principles of the present invention, considerable variation in how these principles are implemented is possible. Specifically, the exact arrangement, power output, number, etc. of the infrared lamps may be determined by the user according to each application, for instance to generate a particular thermal gradient in the preform or to produce containers of a particular size and general shape. The usage of lamps to provide the infrared radiation (as opposed to gas-fired burners and the like) is particularly advantageous in that such lamps, whether LED or tungsten-filament, may be turned on and off during the fabrication of the container.

Furthermore, it may in some applications be possible to combine control of the injection of the injection liquid and advancement of the stretching rod with monitoring the temperature of the preform during the heating step and energizing/de-energizing the infrared lamps accordingly, so as to exert active control over the deformation of the preform and the ultimate form and volume of the container.

Finally, it should be understood by those versed in the arts of machine design and process engineering that the apparatuses disclosed in the Figures and discussed here above may be adapted for more efficient use in a factory setting, for instance by the provision of materials-handling and other such automation capabilities. The exact construction of the container-fabricating apparatus should not be construed as limited by the Figures or the foregoing embodiments.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. An apparatus for fabricating a container from a preform using a liquid as a forming medium injected into a cavity of the preform, the apparatus comprising:
   a source of the liquid;
   an injection head having a nozzle in fluid communication with the source of the liquid, with a substantially vertically oriented longitudinal axis of the injection head defined through the nozzle;
   an expansion zone defined adjacent to the nozzle and having a circumferentially symmetrical shape about the longitudinal axis, the expansion zone configured to accommodate the preform with the preform in fluid communication with the nozzle and being expanded by injecting of the liquid into the preform, and the expansion of the preform taking place by free blowing of the preform while stationary in the expansion zone; and
   a plurality of infrared-emitting, elements disposed circumferentially and symmetrically about the expansion zone and disposed with each of the elements extending along a respective axis thereof which is arranged either parallel to and about the longitudinal axis or about a rotational center of the expansion zone and perpendicular to the longitudinal axis, each of the infrared-emitting elements being oriented to direct infrared radiation into the expansion zone.

2. The apparatus as claimed in claim 1, wherein the infrared-emitting elements each have a substantially vertically-oriented longitudinal axis, said infrared-emitting elements being disposed at substantially equal intervals about the longitudinal axis of the injection head in an arrangement substantially conforming to a curved contour.

3. The apparatus as claimed in claim 2, wherein the curved contour is substantially circular.

4. The apparatus as claimed in claim 1, wherein the infrared-emitting elements have a substantially horizontally-oriented longitudinal axis and are grouped into a plurality of arrays, each infrared emitting element being substantially parallel to each other infrared-emitting element in its respective array, and the arrays being disposed at substantially equiangular intervals about the longitudinal axis of the injection head.

5. The apparatus as claimed in claim 4, wherein each of the infrared-emitting element arrays is disposed in an arrangement substantially conforming to a curved contour about the rotational center of the expansion zone.

6. The apparatus as claimed in claim 5, wherein the curved contour is a segment of a substantially circular arc.

7. The apparatus as claimed in claim 1, wherein the infrared-emitting elements are disposed such that a line perpendicular to the longitudinal axis of each of the infrared-emitting elements intersects both the infrared-emitting element at the midpoint thereof and the longitudinal axis of the injection head.

8. The apparatus as claimed in claim 1, wherein the infrared-emitting elements are infrared light-emitting diodes.

9. The apparatus as claimed in claim 1, wherein the infrared-emitting elements are tungsten-filament incandescent lamps.

10. The apparatus as claimed in claim 1, further comprising at least one shield disposed between the preform and the infrared-emitting elements, the shield having a coefficient of transmission of at least 90% for near and medium infrared waves.

11. A container-fabrication ensemble comprising:
   the preform of claim 1 as a substantially tubular preform having a preform cavity; and
   a container-fabricating apparatus as claimed in claim 1.

* * * * *